United States Patent
Yamamoto et al.

(10) Patent No.: US 6,597,285 B2
(45) Date of Patent: Jul. 22, 2003

(54) NON-CONTACT COMMUNICATION APPARATUS AND CONTROL METHOD FOR NON-CONTACT COMMUNICATION APPARATUS

(75) Inventors: Akiyasu Yamamoto, Kanagawa-ken (JP); Takeshi Kumagaya, Ibaraki-ken (JP); Yuuichi Goto, Kanagawa-ken (JP); Hiroyuki Sakamoto, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 225 days.

(21) Appl. No.: 09/801,788

(22) Filed: Mar. 9, 2001

(65) Prior Publication Data

US 2002/0018001 A1 Feb. 14, 2002

(30) Foreign Application Priority Data

Mar. 15, 2000 (JP) ......................... 2000-071919

(51) Int. Cl.⁷ ................................. G08B 1/08
(52) U.S. Cl. .................. 340/539; 340/506; 340/3.1; 340/825.69; 340/825.72
(58) Field of Search ................. 340/506, 539, 340/3.1, 825.69, 825.72; 235/492, 441; 358/482; 607/2

(56) References Cited

U.S. PATENT DOCUMENTS

| | | | | |
|---|---|---|---|---|
| 4,472,666 A | * | 9/1984 | Akeda et al. | 318/254 |
| 4,791,285 A | * | 12/1988 | Ohki | 235/449 |
| 4,992,850 A | * | 2/1991 | Corbett et al. | 257/203 |
| 5,182,442 A | * | 1/1993 | Takahira | 235/492 |
| 5,216,287 A | * | 6/1993 | Tigges et al. | 307/116 |
| 5,265,001 A | * | 11/1993 | Yasumura | 363/49 |
| 5,418,353 A | * | 5/1995 | Katayama et al. | 235/380 |
| 5,569,903 A | * | 10/1996 | Matsubara | 235/492 |
| 6,070,804 A | | 6/2000 | Miyamoto | 235/494 |
| 6,072,290 A | * | 6/2000 | Takagi et al. | 318/283 |
| 6,090,323 A | * | 7/2000 | Izuhara et al. | 264/255 |

FOREIGN PATENT DOCUMENTS

| EP | 0762321 A2 | 12/1995 |
|---|---|---|
| EP | 0977144 A1 | 7/1998 |

OTHER PUBLICATIONS

Kessels et al., "Applying asynchronous circuits in contact-less smart cards," IEEE 2000, pp. 36–44.

* cited by examiner

*Primary Examiner*—Daryl Pope
(74) *Attorney, Agent, or Firm*—Pillsbury Winthrop LLP

(57) ABSTRACT

A control method for a non-contact communication apparatus communicating information to an external device in a non-contact state is provided. The control method includes the steps of stopping an operation of a control circuit after the control circuit performs a predetermined control operation when processing operations relating to the writing and reading of information is to be executed, and executing a predetermined process by an execution circuit which is scheduled to operate next under control by a logical circuit with the control circuit kept stopped when the supply voltage reaches a predetermined value with the result that a load is applied to the supply power supplied from outside.

13 Claims, 7 Drawing Sheets

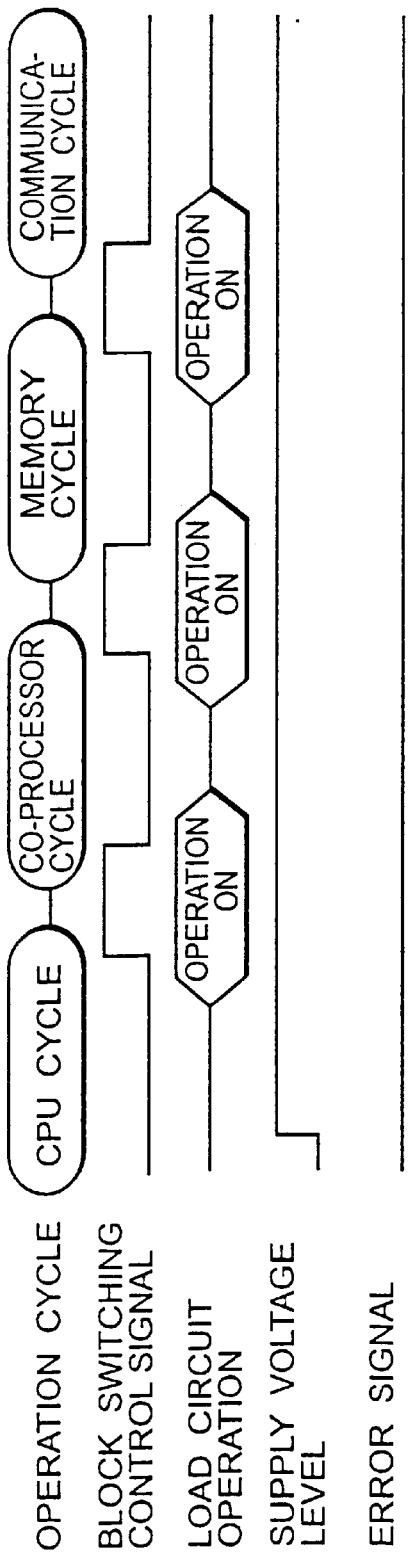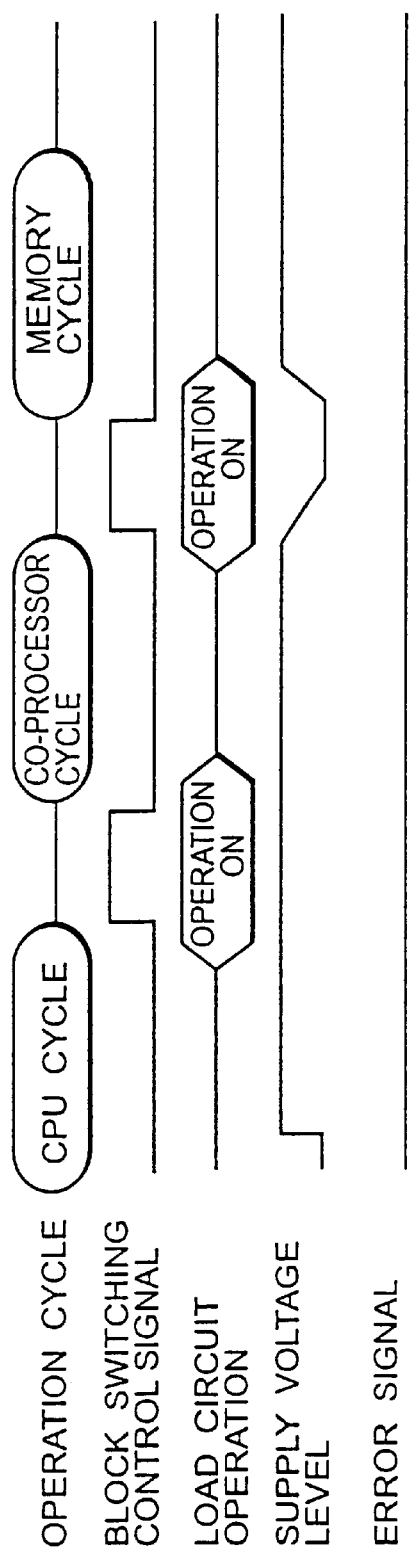

NON-CONTACT COMMUNICATION APPARATUS AND CONTROL METHOD FOR NON-CONTACT COMMUNICATION APPARATUS

BACKGROUND OF THE INVENTION

1. Field of the Invention

The present invention relates to a non-contact communication apparatus for reading and writing information by executing radio communication in the non-contact state with an information processor and a control method for the non-contact communication apparatus.

2. Description of the Invention

At present, in place of contact IC cards, non-contact IC cards enabling non-contact communication by radio are introduced increasingly. In correspondence with it, many requests such as the reliability on non-contact IC cards, necessity of high-level print, necessity of embossing, combination with magnetic stripes, and others must be satisfied. Therefore, various non-contact IC cards are manufactured by respective systems and manufacturers.

The non-contact IC card obtains the power and a clock signal, which are necessary for the operation of itself by power supply waves sent from the reader/writer side, which is an information processor. In data communication from the reader/writer to the non-contact IC card, the power supply waves are often superimposed with data and the reception circuit of the non-contact IC card receives and demodulates the radio waves on a large level. On the other hand, the reader/writer side communicating with the non-contact IC card demodulates data from the non-contact IC card operating by the power by the power supply waves by sending the power supply waves.

As mentioned above, in the non-contact IC card, the power and a clock signal are sent and supplied from the reader/writer side, so that a supply voltage detection circuit for monitoring the supply voltage level is built in.

A conventional apparatus as mentioned above, when the supply voltage under monitoring becomes unstable, automatically stops the operation. However, when the supply voltage becomes unstable during writing and reading data from the memory, the backup becomes impossible. Therefore, a problem arises that during writing of data, the memory contents may be destroyed, while during reading of data, the data cannot be read correctly and malfunctions may be caused. When the capacity of the power supply and supply voltage detection circuit is increased so as to keep the power supply stable, it can be avoided. However, a problem arises that the circuit is enlarged in scale and cannot be mounted on one chip and even if it can be mounted on one chip, the chip area is increased and the chip is easily broken.

SUMMARY OF THE INVENTION

An object of the present invention is to provide a non-contact communication apparatus and a control method for the non-contact communication apparatus for reducing the power consumption and preventing malfunctions due to insufficient power.

According to the present invention, a non-contact communication apparatus communicating information to an external device in a non-contact state is provided. The non-contact communication apparatus comprises an antenna for receiving information transmitted from the external device or transmitting information to the external device; a control circuit connected to the antenna for controlling processes concerning a signal transmitted or received by the antenna; an execution circuit for executing a predetermined process concerning a signal transmitted or received by the antenna without operating at the same time with the control circuit; power generation means connected to the antenna for generating supply power to be supplied to each circuit of the apparatus; load generation means for generating a load when the execution circuit executes a predetermined process and applying the load to the supply power; detection means for detecting whether the supply voltage reaches a predetermined value when the load generated by the load generation means is supplied to the supply power; and a logical circuit, having power consumption lower than power consumed by the control circuit and the execution circuit, for controlling the execution circuit so as to execute a predetermined process according to an instruction of the control circuit when the detection means detects the supply voltage reaches a predetermined value.

Furthermore, according to the present invention, a control method for a non-contact communication apparatus communicating information to an external device in a non-contact state is provided. The control method comprises the steps of stopping an operation of a control circuit after the control circuit performs a predetermined control operation when processing operations relating to the writing and reading of information is to be executed; and executing a predetermined process by an execution circuit which is scheduled to operate next under control by a logical circuit with the control circuit kept stopped when the supply voltage reaches a predetermined value with the result that a load is applied to the supply power supplied from outside.

BRIEF DESCRIPTION OF THE DRAWINGS

FIGS. 6A and 6B are operation timing charts for explaining the timing of supplying a load to the power supply by the load circuit, and FIG. 6A is a chart indicating the timing in the normal state that the supply power is stable, and FIG. 6B is a chart for explaining the timing when the supply power is unstable and an error occurs;

DETAILED DESCRIPTION OF THE PREFERRED EMBODIMENTS

Figure 2:
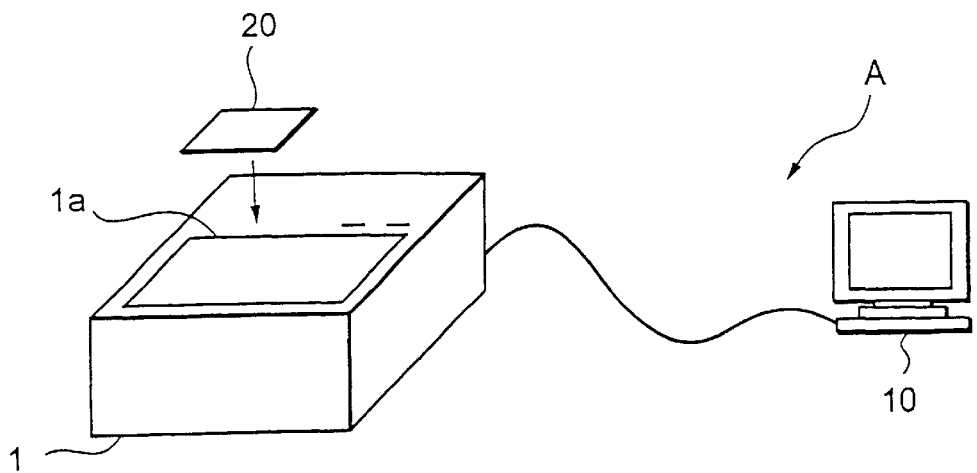
FIG. 2 is a schematic view for explaining an information processing system using a non-contact IC card.

The embodiments of the present invention will be explained in detail hereunder with reference to the accompanying drawings. FIG. 2 is a drawing for explaining an information processing system to which a non-contact IC card as a non-contact communication apparatus relating to the present invention is applied. As shown in FIG. 2, the information system A is composed of a reader/writer 1 as an information processor, a host computer 10 as a host device connected to the reader/writer 1, and a non-contact IC card 20 for communicating with the reader/writer 1.

The reader/writer 1 has a communication area 1a with the non-contact IC card 20 on the top thereof. Inside the communication area 1a, a transmission antenna and a reception antenna which are not shown in the drawing are installed and when the non-contact IC card 20 approaches the communication area 1a, the communication area 1a can communicate with the non-contact IC card 20.

Figure 3:
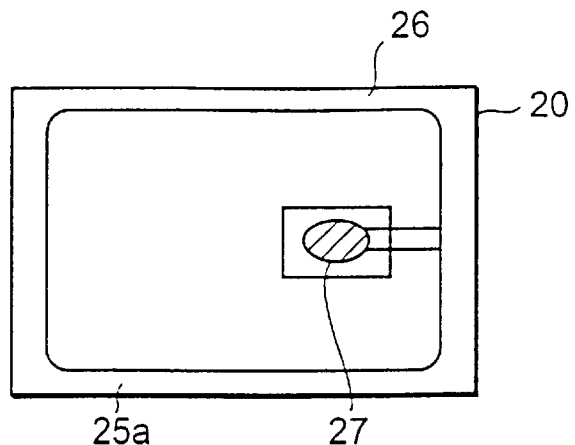
FIG. 3 is a plan view for explaining a schematic structure of a non-contact IC card.
Figure 4:
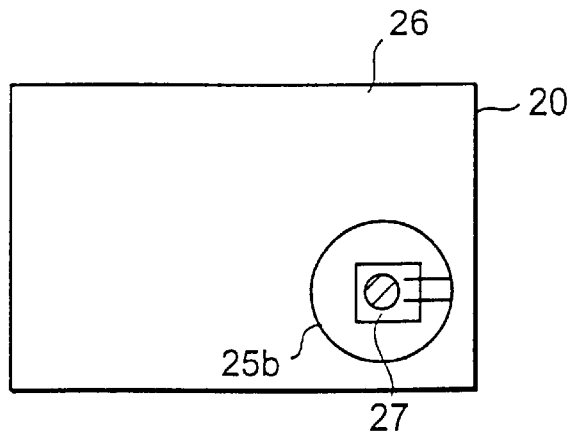
FIG. 4 is a plan view for explaining a schematic structure of a non-contact IC card.

FIGS. 3 and 4 are drawings for explaining a schematic structure of the non-contact IC card 20 used in the information processing system A shown in FIG. 2.

As shown in FIG. 3, the non-contact IC card 20 is composed of a rectangular card member 26, a coil-shaped transmitting/receiving antenna 25a arranged along the periphery of the card member 26 inside the card member 26, and electronic parts 27 which are mounted on the surface of the substrate arranged in the longitudinal direction of the card member 26 and at the deviated position from the center in the longitudinal direction on the right shown in the drawing and connected to the transmitting/receiving antenna 25a.

As shown in FIG. 4, the non-contact IC card 20 is composed of the rectangular card member 26, a coil-shaped transmitting/receiving antenna 25b arranged at the lower right position of the card member 26 shown in the drawing inside the card member 26, and the electronic parts 27 which are mounted on the surface of the substrate positioned inside the transmitting/receiving antenna 25b and connected to the transmitting/receiving antenna 25b.

As an embodiment of the non-contact IC card, a card-shaped one is taken up. However, the present invention is not limited to it and needless to say, various shapes such as coil shape and sheet shape may be available if the transmitting/receiving antenna 25 and the electronic parts 27 are mounted.

Figure 1:
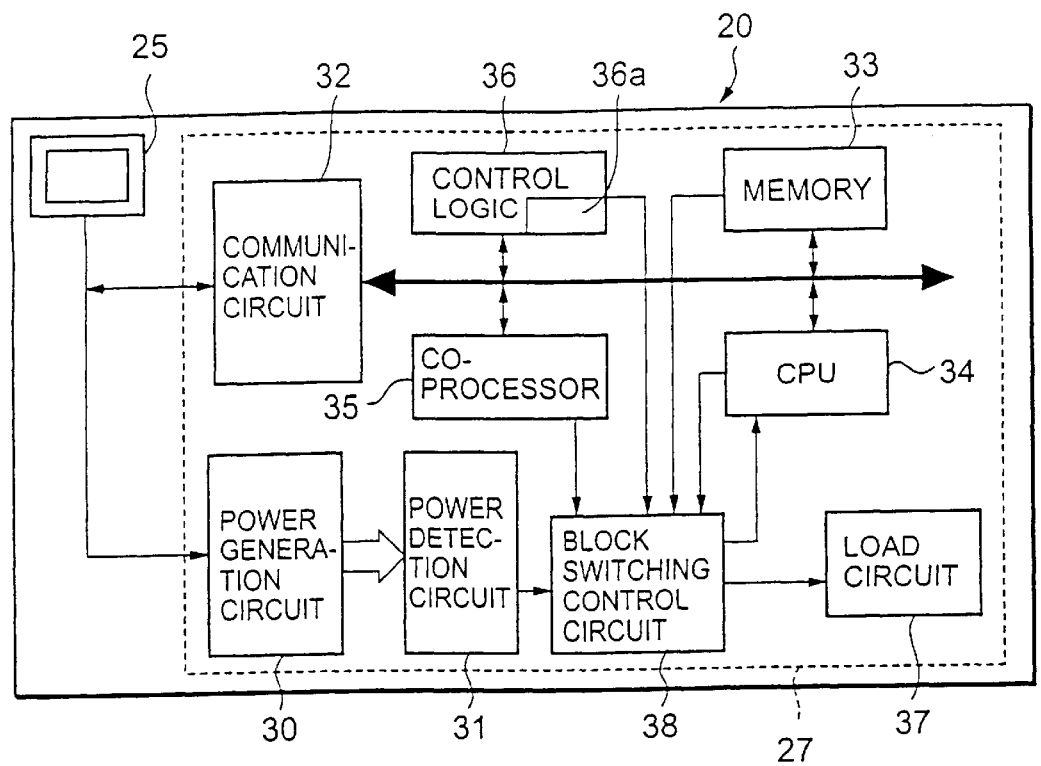
FIG. 1 is a control block diagram of a non-contact IC card relating to the non-contact communication apparatus of the present invention.

FIG. 1 is a control block diagram of the none-contact IC card 20. As shown in FIG. 1, the non-contact IC card 20 is composed of a transmitting/receiving antenna 25, a power generation circuit 30, a power detection circuit 31, a communication circuit 32, a memory 33, a CPU 34, a co-processor 35, control logic 36, a load circuit 37, and a block switching control circuit 38.

The transmitting/receiving antenna 25 receives modulated waves transmitted from the reader/writer 1 or radiates modulated waves to the outside.

The power generation circuit 30 generates power to be supplied to the internal circuit from the modulated waves received by the transmitting/receiving antenna 25.

The power detection circuit 31 functions as a detection means for monitoring the supply voltage generated by the power generation circuit 30.

The communication circuit 32 modulates the data for modulating or transmitting to the outside the modulated waves received from the transmitting/receiving antenna 25.

The memory 33 functions as a storage means for storing the control program, information to be transmitted or received, and others.

The CPU 34 functions as a control circuit for decoding an instruction which is received by the transmitting/receiving antenna 25 and demodulated by the communication circuit 32 and controlling each circuit inside the non-contact IC card 20 in correspondence with execution of the instruction.

The co-processor 35 functions as a coding circuit for performing the calculation process necessary for the coding process for security.

The control logic 36 functions as a logical circuit for performing various logic operations according to an instruction of the CPU 34. In the control logic 36, a data register 36a is installed as a temporary storage means used for writing of data in various processes.

The load circuit 37 functions so as to apply a load to the power generated by the power generation circuit 30.

The block switching control circuit 38 generates a timing signal for operating the load circuit 37.

The load circuit 37 and the block switching control circuit 38 structure a load generation means.

The electronic parts 27 in this embodiment are explained as a part enclosed by a dotted line excluding the transmitting/receiving antenna 25. However, a module that the transmitting/receiving antenna 25 is mounted on the same substrate is included.

The non-contact IC card structured like this, among various circuits mentioned above, is designed to prevent a plurality of circuits from operating at the same time. Particularly, the circuits requiring large power consumption during operation, for example, the CPU 34, the co-processor 35, and the memory 33 are controlled so as not to be operated at the same time (not processed in parallel) but to be processed in series. And, in the intervals of these circuit operations, that is, before starting the operation of the next circuit, a load is applied to the power by the load circuit 37, and it is detected that the next circuit can operate normally, and then the operation of the next circuit is started.

Figure 5:
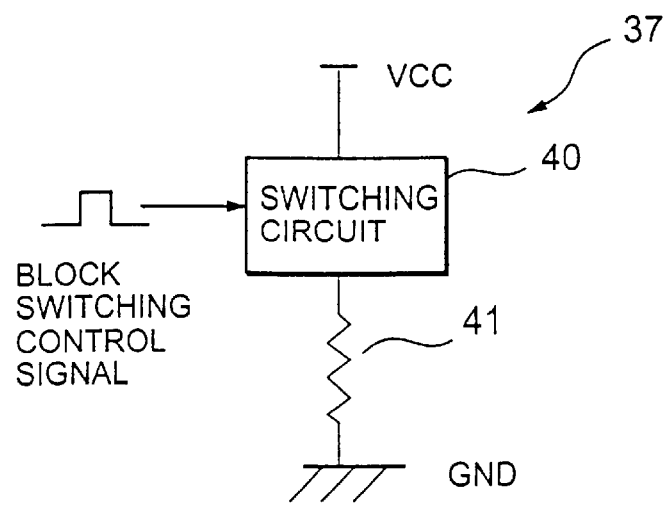
FIG. 5 is a circuit diagram for explaining a schematic structure of a load circuit.

FIG. 5 shows the schematic structure of the load circuit 37. As shown in FIG. 5, in the load circuit 37, a resistor 41 (the resistance is optional) is connected to a switching circuit 40 and the other end of the resistor 41 is grounded. The switching circuit 40, when the logical value "H (High)" is input as an input signal, is turned "ON" and when the logical value "L (Low)" is input, is turned "OFF". Then, a block switching control signal to be output from the block switching control circuit 38 which will be described later is input, and when a block switching control signal "H (High)" is input, the switching circuit 40 is turned "ON", and a load is generated.

FIG. 6 is an operation timing chart for explaining the timing of supplying a load to the power supply by the load circuit 37 shown in FIG. 5, and FIG. 6A is a chart indicating the normal state that the supply power is stable, and FIG. 6B is a chart for explaining the case that the supply power is unstable and an error occurs. In the process that a series of operations of each circuit (a series of operations of the respective circuits is referred to as an operation cycle) is sequentially performed (in series), before starting the operation cycle of the next circuit, the load circuit 37 is always operated and a load is applied to the power supply. As a result, by detecting the power level, before starting the operation cycle of the next circuit, it is detected whether the circuit can operate normally.

As such an operation cycle for applying a load beforehand and detecting the power level, for example, the CPU cycle that the CPU 34 operates, the co-processor cycle that the co-processor 35 operates, the memory cycle accompanying the writing operation or reading operation from the memory 33, and the communication cycle that the communication circuit 32 operates in correspondence to transmission or reception of a signal with the non-contact IC card 20 may be cited.

As shown in FIG. 6A, an error signal is in the "L (Low)" state as an initial state. And, upon receipt of modulated waves from the transmitting/receiving antenna 25 of the non-contact IC card 20, the power generation circuit 30 generates power. When the generated power reaches the supply voltage at which the respective circuits in the non-contact IC card 20 can operate, the supply voltage level is turned "H (High)". Then, the CPU 34 starts a predetermined operation (CPU cycle) using the generated power.

When the CPU cycle is finished, before the co-processor 35 starts the co-processor cycle next, a block switching control signal "H (High)" is generated from the block switching control circuit and input to the switching circuit 40 of the load circuit 37. The switching circuit 40 enters the "ON" state after the block switching control signal "H" is input. When the switching circuit 40 is changed to the "ON" state, a load is generated and applied to the power supply. When no change appears in the supply voltage level when the load is applied (the fixed level is kept), the co-processor 35 moves to the next co-processor cycle.

As shown in FIG. 6B, when the load circuit 37 is operated and a load is applied to the power supply, the supply voltage level is changed and when the reduction in the supply voltage level is detected, the error signal goes "H" and the CPU 34 is interrupted. Then, the interrupted CPU 34 moves to a predetermined operation, which is decided beforehand. The predetermined operation which is preset, for example, puts a series of operations under processing into the stop state and returns it to its initial state. Further, as a retry routine, an operation that the load circuit 37 is operated once again, and a load is applied to the power supply, and the process is tried again from the first cycle may be considered.

In this way, whenever the operation cycle is changed, before starting the next operation cycle, a pulse of the block switching control signal "H" is generated by the block switching control circuit 38, and the load circuit 37 is operated, and a load is applied to the power supply. When it is detected that even if the load is applied, the supply voltage level is kept on a fixed level, the co-processor moves to the next operation cycle and when it detects the reduction in the supply voltage level, stops a series of operations. Further, when a retry routine is preset and the co-processor detects the reduction in the supply voltage level, it stops a series of operations and then repeats the load application operation and the movement to the next operation cycle as a retry routine.

Figure 7:
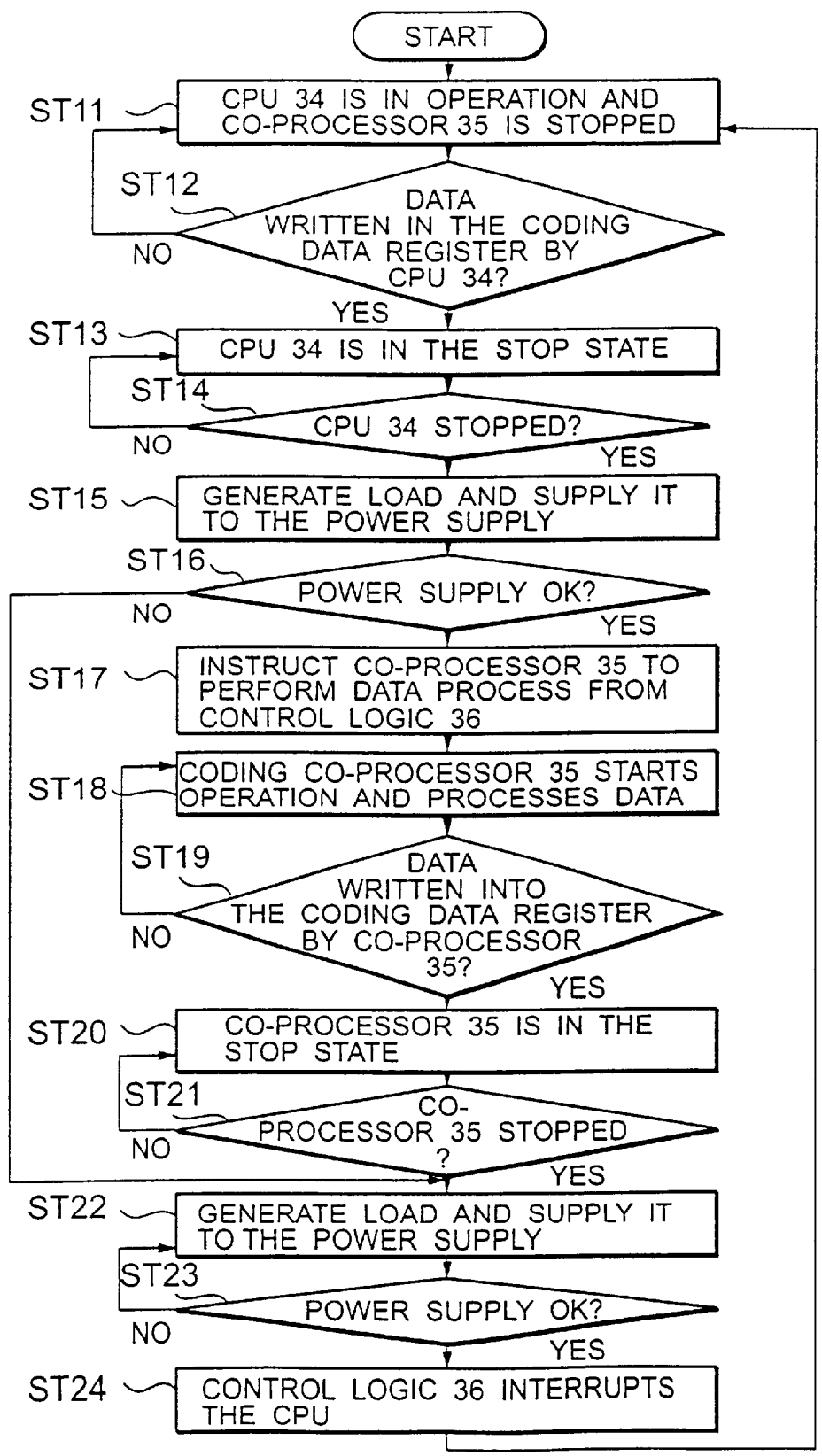
FIG. 7 is a flow chart showing the operation concerning a CPU and a coding processor relating to the control method of the present invention.

FIG. 7 is an operation flow chart for explaining the control method concerning the CPU 34 and the coding co-processor 35. In this embodiment, the CPU 34 and the coding co-processor 35 are structured so as not to operate at the same time in consideration of power consumption. Namely, when the CPU 34 is in operation, the coding co-processor 35 is stopped and when the coding co-processor 35 is in operation, the CPU 34 is stopped. This is realized when the control logic 36 of lower power consumption operates simultaneously with the CPU 34 or the co-processor 35. According to an interruption instruction to the CPU 34 and a data processing instruction to the co-processor 35 by the control logic 36, the CPU 34 and the co-processor 35 start operation.

As shown in FIG. 7, when the CPU 34 is in operation first, the coding co-processor 35 is stopped (ST11). The CPU 34, after performing a predetermined process, writes data into the coding data register 36a installed in the control logic 36 (ST12). When the CPU 34 at Step ST12 writes data into the data register 36a, the CPU 34 stops operation and enters the stop state (ST13). Then, the control logic 36 ascertains that the CPU 34 writes data into the data and the CPU 34 is stopped (ST14). A state detection means is structured by Step ST14.

When it is ascertained at Step ST14 that the CPU 34 is stopped, the block switching control signal "H" is generated from the block switching control circuit 38 and the switching control signal "H" is input to the switching circuit 40 of the load circuit 37. The switching circuit 40, when the block switching control signal "H" is input, enters the "ON" state, generates a load, and supplies the load to the power supply (ST15). The control logic 36 detects whether the supply voltage level is changed when the load is supplied at Step ST15 (ST16). When the supply voltage level is not changed (the level is kept at a fixed level), the control logic 36 outputs an instruction of data processing to the coding co-processor 35 (ST17). Upon receipt of the instruction of data processing at Step ST17, the co-processor 35 starts the data processing operation on the basis of the instruction (ST18). The co-processor 35 finishes a predetermined process and writes data into the coding data register 36a in the control logic 36 (ST19). When data is written into the data register 36a by the co-processor 35 at Step ST19, the co-processor 35 stops operation and enters the stop state (ST20). Then, the control logic 36 ascertains that data is written into the data register 36a by the coding co-processor 35 and the co-processsor 35 is stopped (ST21). When it is ascertained at Step ST21 that the co-processor is stopped, the block switching control signal "H" is generated from the block switching control circuit and the switching control signal "H" is input to the switching circuit 40 of the load circuit 37. The switching circuit 40, when the block switching control signal "H" is input, enters the "ON" state, generates a load, and supplies the load to the power supply (ST22). The control logic 36 detects whether the supply voltage level is changed when the load is supplied to the power supply at Step ST22 (ST23). When the supply voltage level is not changed (the level is kept at a fixed level), the control logic 36 interrupts the CPU 34 so as to make the CPU 34 operate and the CPU 34 performs a revival operation (ST24).

When the control logic 36 detects at Step ST16 that the supply voltage level is changed and reduced, the control logic 36 goes to Step ST22 so as to interrupt the CPU 34. Namely, when the block switching control signal "H" is generated from the block switching control circuit 38 and input to the switching circuit 40 of the load circuit 37, a load is generated from the switching circuit 40 and supplied to the power supply (ST22). The control logic 36 detects whether the supply voltage level is changed when the load is supplied to the power supply at Step ST22 (ST23). At Step ST23, power detection is executed so as to interrupt the CPU 34, so that the power detection is repeated until it is detected that the supply voltage level is fixed. When the supply voltage level is not changed (the level is kept at a fixed level) at ST23, the control logic 36 interrupts the CPU 34 so as to make the CPU 34 operate and the CPU 34 performs a revival operation (ST24).

Figure 8:
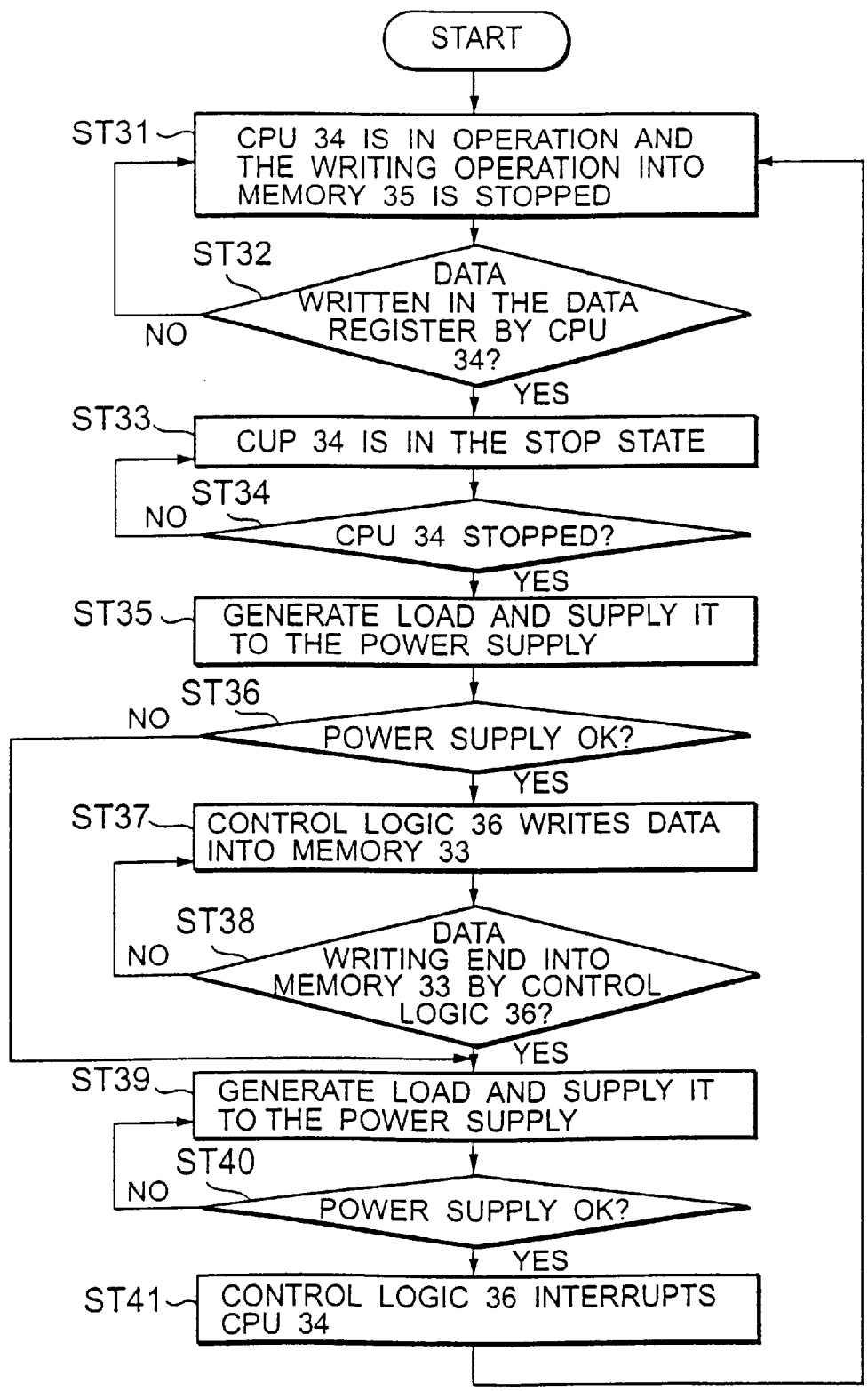
FIG. 8 is a flow chart showing the operation of writing concerning a CPU and a memory relating to the control method of the present invention.

FIG. 8 is a flow chart for explaining the control method for the operation of the CPU 34 and the writing operation into the memory. In this embodiment, the CPU 34 and the memory 33 are structured so as not to operate at the same time in consideration of power consumption. Namely, when the CPU 34 is in operation, the control logic 36 does not access the memory 33 and when the control logic 36 is performing the writing operation into the memory 33, the CPU 34 is stopped. The reason is that when the control logic 36 of lower power consumption operates simultaneously with the CPU 34 or the memory 33 via the internal data register 36a, even if the CPU 34 and the memory 33 do not operate at the same time, the control logic 36 can write data into the memory 33.

As shown in FIG. 8, when the CPU 34 is in operation first, the writing operation into the memory 33 is stopped (ST31). The CPU 34, after performing a predetermined process, writes data into the data register 36a installed in the control logic 36 (ST32). When the CPU 34 at Step ST32 writes data into the data register 36a, the CPU 34 stops operation and enters the stop state (ST33). Then, the control logic 36 ascertains that the CPU 34 writes data into the data and the CPU 34 is stopped (ST34). A state detection means is structured by Step ST34. When it is ascertained at Step ST34 that the CPU 34 is stopped, the block switching control signal "H" is generated from the block switching control circuit 38 and the switching control signal "H" is input to the switching circuit 40 of the load circuit 37. The switching circuit 40, when the block switching control signal "H" is input, enters the "ON" state, generates a load, and supplies the load to the power supply (ST35).

The control logic 36 detects whether the supply voltage level is changed when the load is supplied at Step ST35 (ST36). When the supply voltage level is not changed (the level is kept at a fixed level), the control logic 36 starts the writing operation of the data written in the data register 36a into the memory 33 (ST37). The control logic 36, when data is written into the memory 33, stops the operation of the memory 33 and puts it into the stop state (ST38). The control logic 36, when the data writing is finished, generates the block switching control signal "H" from the block switching control circuit 38 and the switching control signal "H" is input to the switching circuit 40 of the load circuit 37. The switching circuit 40, when the block switching control signal "H" is input, enters the "ON" state, generates a load, and supplies the load to the power supply (ST39). The control logic 36 detects whether the supply voltage level is changed when the load is supplied to the power supply at Step ST39 (ST40). When the supply voltage level is not changed (the level is kept at a fixed level), the control logic 36 interrupts the CPU 34 so as to make the CPU 34 operate and the CPU 34 performs a revival operation (ST41).

When the control logic 36 detects at Step ST36 that the supply voltage level is changed and reduced, the control logic 36 goes to Step ST39 so as to interrupt the CPU 34. Namely, when the block switching control signal "H" is generated from the block switching control circuit 38 and input to the switching circuit 40 of the load circuit 37, a load is generated from the switching circuit 40 and supplied to the power supply (ST39). The control logic 36 detects whether the supply voltage level is changed when the load is supplied to the power supply at Step ST39 (ST40). At Step ST40, power detection is executed so as to interrupt the CPU 34, so that the power detection is repeated until it is detected that the supply voltage level is fixed. When the supply voltage level is not changed (the level is kept at a fixed level) at ST40, the control logic 36 interrupts the CPU 34 so as to make the CPU 34 operate and the CPU 34 performs a revival operation (ST41).

Figure 9:
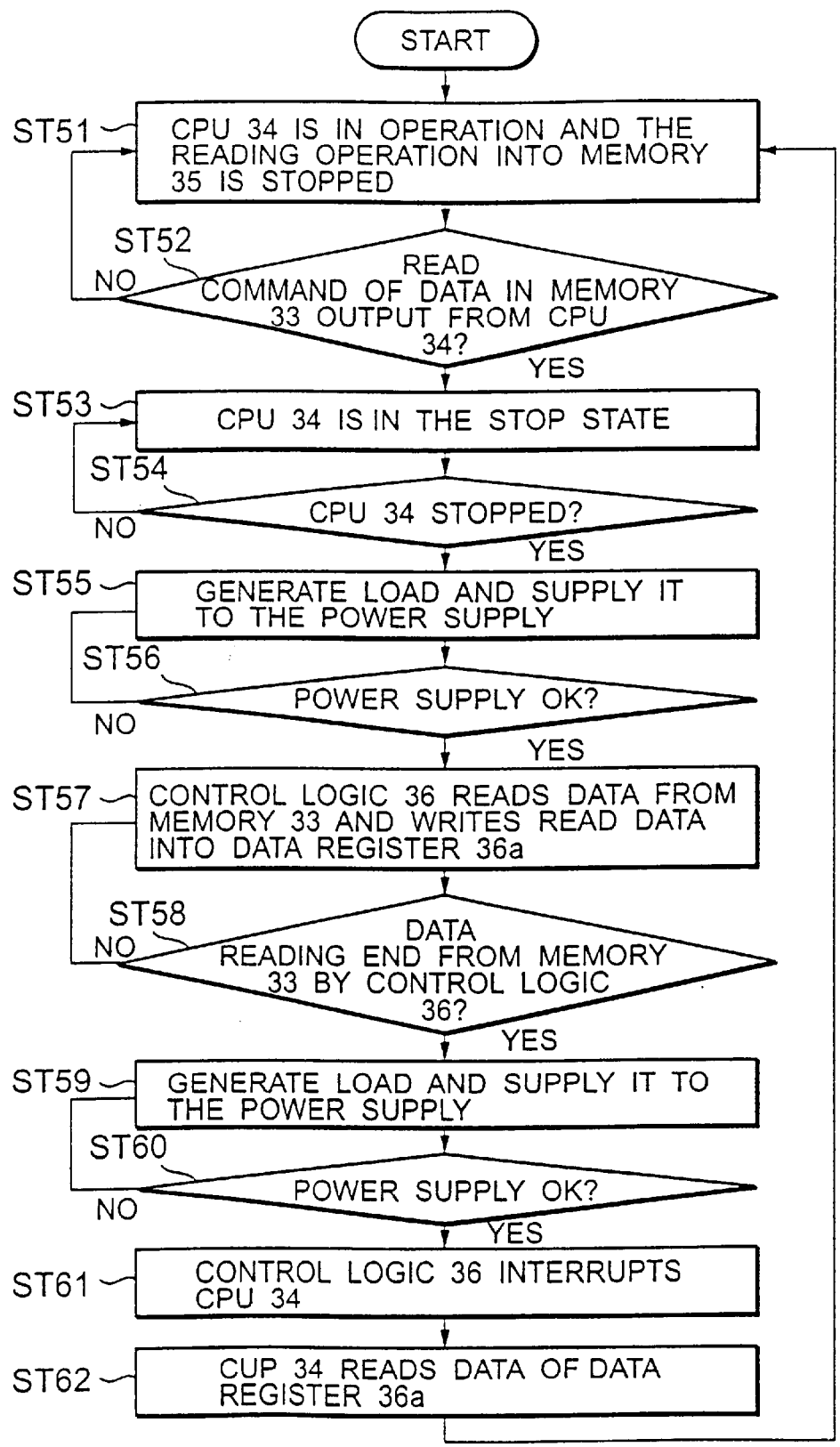
FIG. 9 is a flow chart showing the operation of reading concerning a CPU and a memory relating to the control method of the present invention.

FIG. 9 is a flow chart for explaining the control method for the operation of the CPU 34 and the reading operation into the memory. In this embodiment, the CPU 34 and the memory 33 are structured so as not to operate at the same time in consideration of power consumption. Namely, when the CPU 34 is in operation, the control logic 36 does not access the memory 33 and when the control logic 36 is reading from the memory 33, the CPU 34 is stopped. The reason is that when the control logic 36 of lower power consumption operates simultaneously with the CPU 34 or the memory 33 via the internal data register 36a, even if the CPU 34 and the memory 33 do not operate at the same time, the control logic 36 can read data from the memory 33.

As shown in FIG. 9, when the CPU 34 is in operation first, the reading operation from the memory 33 is stopped (ST51). The CPU 34, after performing a predetermined process, outputs a read command of data in the memory 33 to the control logic 36 (ST52). When the CPU 34 outputs the read command at Step ST52, the CPU 34 stops operation and enters the stop state (ST53). Then, the control logic 36, upon receipt of the read command from the CPU 34, ascertains that the CPU 34 are stopped (ST54). A state detection means is structured by Step ST54. When it is ascertained at Step ST54 that the CPU 34 is stopped, the block switching control signal "H" is generated from the block switching control circuit 38 and the switching control signal "H" is input to the switching circuit 40 of the load circuit 37. The switching circuit 40, when the block switching control signal "H" is input, enters the "ON" state, generates a load, and supplies the load to the power supply (ST55).

The control logic 36 detects whether the supply voltage level is changed when the load is supplied at Step ST55 (ST56). When the supply voltage level is not changed (the level is kept at a fixed level), the control logic 36 starts reading of data from a predetermined address of the memory 33 and writes it into the data register 36a (ST57). The control logic 36, when the reading of data is finished, stops the operation of the memory 33 and puts it into the stop state (ST58). The control logic 36, when the data reading is finished, generates the block switching control signal "H" from the block switching control circuit 38 and the switching control signal "H" is input to the switching circuit 40 of the load circuit 37. The switching circuit 40, when the block switching control signal "H" is input, enters the "ON" state, generates a load, and supplies the load to the power supply (ST59). The control logic 36 detects whether the supply voltage level is changed when the load is supplied to the power supply at Step ST59 (ST60). When the supply voltage level is not changed (the level is kept at a fixed level), the control logic 36 interrupts the CPU 34 so as to make the CPU 34 operate, makes the CPU 34 perform a revival operation (ST61), and reads data in the data register 36a (ST62). At Step ST60, power detection is executed so as to interrupt the CPU 34, so that the power detection is repeated until it is detected that the supply voltage level is fixed.

Figure 10:
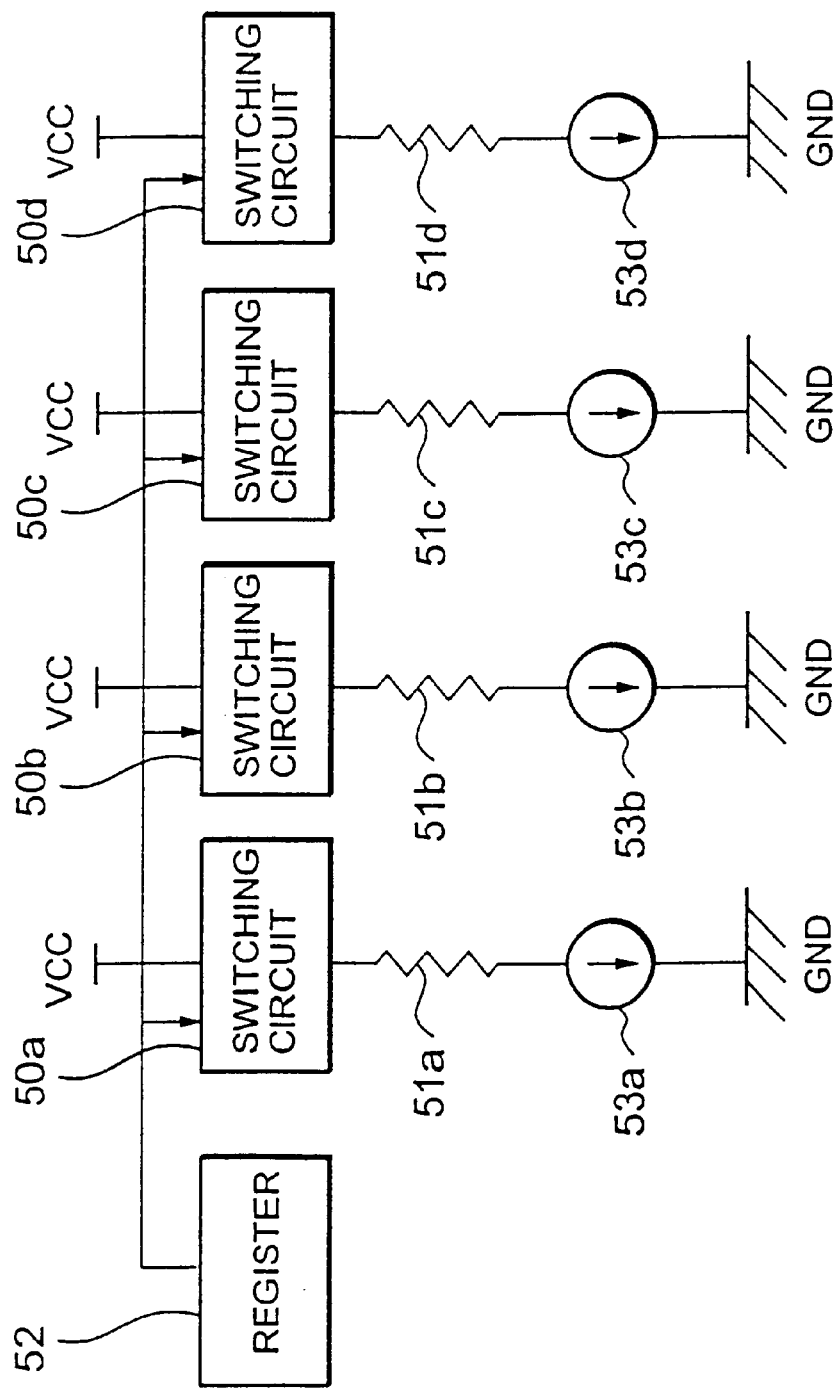
FIG. 10 is a circuit diagram for explaining a schematic structure of a load circuit.

Next, in consideration of a point that the power consumed for processing varies with each circuit, an embodiment that the magnitude of load to be applied to the power supply is set stepwise, and the load fit to the circuit (block) to be operated next is selected, and then the power supply is detected will be explained. FIG. 10 is a drawing showing the second embodiment of the load circuit 37. As shown in FIG. 10, the load circuit 37 has a plurality of switching circuits 50a, 50b, 50c, and 50d and resistors 51a, 51b, 51c, and 51d connected to the respective switching circuits 50a, 50b, 50c, and 50d. The other ends of the resistors 51a, 51b, 51c, and 51d are grounded via current sources 53a, 53b, 53c, and 53d. It can be realized to structure the plurality of switching circuits 50a, 50b, 50c, and 50d all with a switching circuit for outputting a load in the same size respectively, select the number of switching circuits according to the power consumed by the circuit to be operated next, and operate them and such a constitution can be realized also by switching circuits different in the magnitude of load respectively.

By a register 52 as a selection means which is connected to all the switching circuits 50a, 50b, 50c, and 50d, according to the power consumed by the circuit to be operated next, an input signal is selectively input to any (at least one) of the switching circuits 50a, 50b, 50c, and 50d. When the register 52 inputs the logical value "H (High), the switching circuit goes "ON" and when the logical value "L (Low)" is input, the switching circuit goes "OFF". Then, a load generated from each switching circuit, which enters the "ON" state after the input signal "H (High)" is input is added and supplied to the power supply.

As mentioned above, in this embodiment, unless a plurality of circuits (blocks) are operated at the same time, each single circuit (block) is operated and a series of processes is executed in series. Particularly, in consideration of the CPU, co-processsor, and memory as circuits consuming large power among the circuits mounted in the non-contact communication apparatus, it is controlled so as not to write or read data from the CPU and co-processor and from the CPU and memory at the same time. Therefore, an effect that when each process is to be executed by the non-contact communication apparatus, the power consumed at a time can be reduced greatly can be produced. As a result, an effect that the capacity of the power generation circuit to be mounted in the non-contact communication apparatus can be made smaller and the chip area can be made smaller can be also produced.

Further, this embodiment detects whether by applying a load to the power generated from the power generation circuit before operating a circuit (block), sufficient power for the circuit (block) to operate stably is generated. Therefore, an effect that a stable circuit operation can be performed always and malfunctions of the circuits (blocks) due to insufficient power can be prevented can be produced.

Further, in this embodiment, with respect to a load to be applied to the power before operating the next circuit (block), a load in a fixed magnitude is applied and moreover, in consideration of a point that the power to be consumed varies with the circuit, it is also possible to set the magnitude of load stepwise, select the load fit to the circuit (block) to be operated next, and then detect the power supply. Therefore, a circuit operation, which is stable, more surely can be performed and malfunctions of the circuits (blocks) due to insufficient power can be prevented.

As mentioned above, according to the present invention, the power consumption is reduced and malfunctions due to insufficient power can be prevented.

What is claimed is:

1. A non-contact communication apparatus communicating information to an external device in a non-contact state, comprising:

an antenna for receiving information transmitted from the external device or transmitting information to the external device;

a control circuit connected to the antenna for controlling processes concerning a signal transmitted or received by the antenna;

an execution circuit for executing a predetermined process concerning a signal transmitted or received by the antenna without operating at the same time with the control circuit;

power generation means connected to the antenna for generating supply power to be supplied to each circuit of the apparatus;

load generation means for generating a load when the execution circuit executes a predetermined process and applying the load to the supply power;

detection means for detecting whether the supply voltage reaches a predetermined value when the load generated by the load generation means is supplied to the supply power; and a logical circuit, having power consumption lower than power consumed by the control circuit and the execution circuit, for controlling the execution circuit so as to execute a predetermined process according to an instruction of the control circuit when the detection means detects the supply voltage reaches a predetermined value.

2. A non-contact communication apparatus according to claim 1, further comprising:

temporary storage means, with supply power supplied by the power generation means, for temporarily storing information used between the control circuit and the execution circuit; and state detection means for detecting whether a control operation by the control circuit is stopped or not after information is written into the temporary storage means by the control circuit;

wherein the logical circuit controls the execution circuit so as to operate when the state detection means detects that the information is written into the temporary storage means and the control operation is stopped.

3. A non-contact communication apparatus according to claim 2, wherein the load generation means applies a load to the supply power which is supplied to the execution circuit scheduled to operate next when the state detection means detects that the information is written into the temporary storage means and the control operation is stopped.

4. A non-contact communication apparatus according to claim 1, wherein the load generation means generates a load in accordance with power consumption of the execution circuit which is controlled by the logical circuit and scheduled to operate next.

5. A non-contact communication apparatus according to claim 1, wherein the logical circuit operates the control circuit without operating the execution circuit when the detection means detects that the supply voltage does not reach a predetermined value.

6. A non-contact communication apparatus according to claim 1, wherein the logical circuit controls the load generation means so as to generate a load once more when the detection means detects that the supply voltage does not reach a predetermined value.

7. A non-contact communication apparatus according to claim 1, wherein the execution circuit is a coding circuit for executing a coding process concerning a signal transmitted or received by the antenna without operating at the same time with the control circuit; and the logical circuit has power consumption lower than power consumed by the control circuit and the coding circuit for operating at the same time with the control circuit or the coding circuit and controls the coding circuit according to an instruction of the control circuit when the detection means detects that the supply voltage reaches a predetermined value.

8. A non-contact communication apparatus according to claim 7, further comprising:

temporary storage means, with supply power supplied by the power generation means, for temporarily storing information used between the control circuit and the coding circuit; and state detection means for detecting whether a control operation by the control circuit is stopped or not after information is written into the temporary storage means by the control circuit;

wherein the load generation means applies a load to the supply power which is supplied to the coding circuit when the state detection means detects that the information is written into the temporary storage means and the control operation is stopped.

9. A non-contact communication apparatus according to claim 1, wherein the execution circuit is storage means for storing information received from the external device via the antenna and information to be transmitted to the external device without operating at the same time with the control circuit; and the logical circuit has power consumption lower than power consumed by the control circuit and the storage means for operating at the same time with the control circuit or the storage means and controls the storage means according to an instruction of the control circuit when the detection means detects that the supply voltage reaches a predetermined value.

10. A non-contact communication apparatus according to claim 9, further comprising:

temporary storage means, with supply power supplied by the power generation means, for temporarily storing information used between the control circuit and the storage means; and state detection means for detecting whether a control operation by the control circuit is stopped or not after information is written into the temporary storage means by the control circuit;

wherein the load generation means applies a load to the supply power which is supplied to the storage means when the state detection means detects that the information is written into the temporary storage means and the control operation is stopped.

11. A control method for a non-contact communication apparatus communicating information to an external device in a non-contact state, comprising the steps of:

stopping an operation of a control circuit after the control circuit performs a predetermined control operation when processing operations relating to the writing and reading of information is to be executed; and executing a predetermined process by an execution circuit which is scheduled to operate next under control by a logical circuit with the control circuit kept stopped when the supply voltage reaches a predetermined value with the result that a load is applied to the supply power supplied from outside.

12. A control method according to claim 11, wherein the executing step executes the coding process by the coding circuit under control by a logical circuit with the control circuit kept stopped when the supply voltage reaches a predetermined value with the result that a load is applied to the supply power supplied from outside.

13. A control method according to claim 11, wherein the executing step executes processes by operating the storage means under control by a logical circuit with the control circuit kept stopped when the supply voltage reaches a predetermined value with the result that a load is applied to the supply power supplied from outside.

* * * * *